US012647710B2

(12) United States Patent
Cressman

(10) Patent No.: US 12,647,710 B2
(45) Date of Patent: Jun. 2, 2026

(54) EXTERNAL MICROPHONE COMBINED WITH A HEATING SYSTEM

(71) Applicant: Panasonic Automotive Systems Company of America, Division of Panasonic Corporation of North America, Peachtree City, GA (US)

(72) Inventor: Karl Warren Frisch Cressman, Farmington Hills, MI (US)

(73) Assignee: Panasonic Automotive Systems America, LLC., Peachtree City, GA (US)

( * ) Notice: Subject to any disclaimer, the term of this patent is extended or adjusted under 35 U.S.C. 154(b) by 49 days.

(21) Appl. No.: 18/589,477

(22) Filed: Feb. 28, 2024

(65) Prior Publication Data

US 2024/0205579 A1 Jun. 20, 2024

Related U.S. Application Data

(62) Division of application No. 17/695,561, filed on Mar. 15, 2022, now Pat. No. 11,950,037.

(60) Provisional application No. 63/164,426, filed on Mar. 22, 2021.

(51) Int. Cl.
*H04R 1/08* (2006.01)
*H04R 1/04* (2006.01)
*H04R 3/00* (2006.01)
*H05B 3/22* (2006.01)

(52) U.S. Cl.
CPC ............... *H04R 1/083* (2013.01); *H04R 1/04* (2013.01); *H04R 3/00* (2013.01); *H05B 3/22* (2013.01); *H04R 2499/13* (2013.01)

(58) Field of Classification Search
None
See application file for complete search history.

(56) References Cited

U.S. PATENT DOCUMENTS 11,638,079 B1 * 4/2023 Wu ........................ H04R 3/005 219/202
2021/0352393 A1 * 11/2021 Diego Regla .......... H04R 1/086

* cited by examiner

*Primary Examiner* — Kenny H Truong
(74) *Attorney, Agent, or Firm* — Laurence S. Roach, Esq.

(57) ABSTRACT

A surface vehicle includes a microphone detecting sounds originating outside of the surface vehicle. A heating element is mounted in association with the microphone and provides heat for preventing accumulation of ice near the microphone wherein the ice accumulation would degrade an ability of the microphone to detect sounds originating outside of the surface vehicle.

17 Claims, 5 Drawing Sheets

EXTERNAL MICROPHONE COMBINED WITH A HEATING SYSTEM

CROSS-REFERENCED TO RELATED APPLICATIONS

This application is a divisional of U.S. patent application Ser. No. 17/695,561, filed on Mar. 15, 2022, which claims benefit of U.S. Provisional Application No. 63/164,426, filed on Mar. 22, 2021, the disclosures of which are hereby incorporated by reference in their entireties for all purposes.

BACKGROUND OF THE INVENTION

1. Field of the Invention

The present invention relates to an external microphone system in a surface vehicle.

2. Description of the Related Art

Autonomous vehicles, or other vehicles relying on sensor inputs to calculate safe vehicle transit, must correctly determine the presence of emergency vehicle sirens. One approach to receiving sensor information is to apply a microphone (e.g., acoustic transducer) externally to a vehicle. In adverse weather conditions, such as the winter season, a microphone mounted externally is vulnerable to frost/snow/ice accumulation, which would degrade the microphone's sensitivity. A severe safety hazard can be created if an autonomous vehicle has an accumulation of frost/snow/ice which obscures acoustic data from the microphone(s) and is therefore unable to detect the presence of an emergency vehicle.

One alternative to an external microphone is to place a microphone inside the vehicle. Due to the isolation of sheet metal and glass, routine road noise, environmental control fan noise, entertainment systems and a variety of other interior noises, an internal microphone is much less effective at detecting sirens than an external microphone. Signal processing can be done to moderate these issues; however, it adds additional software complexity.

SUMMARY OF THE INVENTION

The present invention provides a heating element for a microphone (e.g., acoustic transducer) that is mounted externally to a surface vehicle. The invention adds a heating element to the microphone's physical construction to continuously melt any accumulation of frost/snow/ice and thereby ensure that the microphone sensor receives correct acoustic input from the vehicle exterior ambient environment.

The invention comprises, in one form thereof, a surface vehicle including a microphone detecting sounds originating outside of the surface vehicle. A heating element is mounted in association with the microphone and provides heat for preventing accumulation of ice near the microphone wherein the ice accumulation would degrade an ability of the microphone to detect sounds originating outside of the surface vehicle.

The invention comprises, in another form thereof, a method of operating a microphone in a surface vehicle, including using the microphone to detect sounds originating outside of the surface vehicle. A heating element is mounted in association with the microphone. The heating element is energized to provide heat that prevents accumulation of ice near the microphone wherein the ice accumulation would degrade an ability of the microphone to detect sounds originating outside of the surface vehicle.

The invention comprises, in yet another form thereof, a microphone arrangement for a surface vehicle. The microphone arrangement includes a microphone detecting sounds originating outside of the surface vehicle. A printed circuit board is electrically connected to the microphone. A housing substantially encloses the microphone and the printed circuit board. The housing includes a wall having a heating element embedded therein. The printed circuit board is disposed between the microphone and the wall having the heating element embedded therein.

The invention comprises, in still another form thereof, a microphone arrangement for a surface vehicle. The microphone arrangement includes a microphone detecting sounds originating outside of the surface vehicle. A printed circuit board is electrically connected to the microphone. The heating element is included in the circuit board with the microphone.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
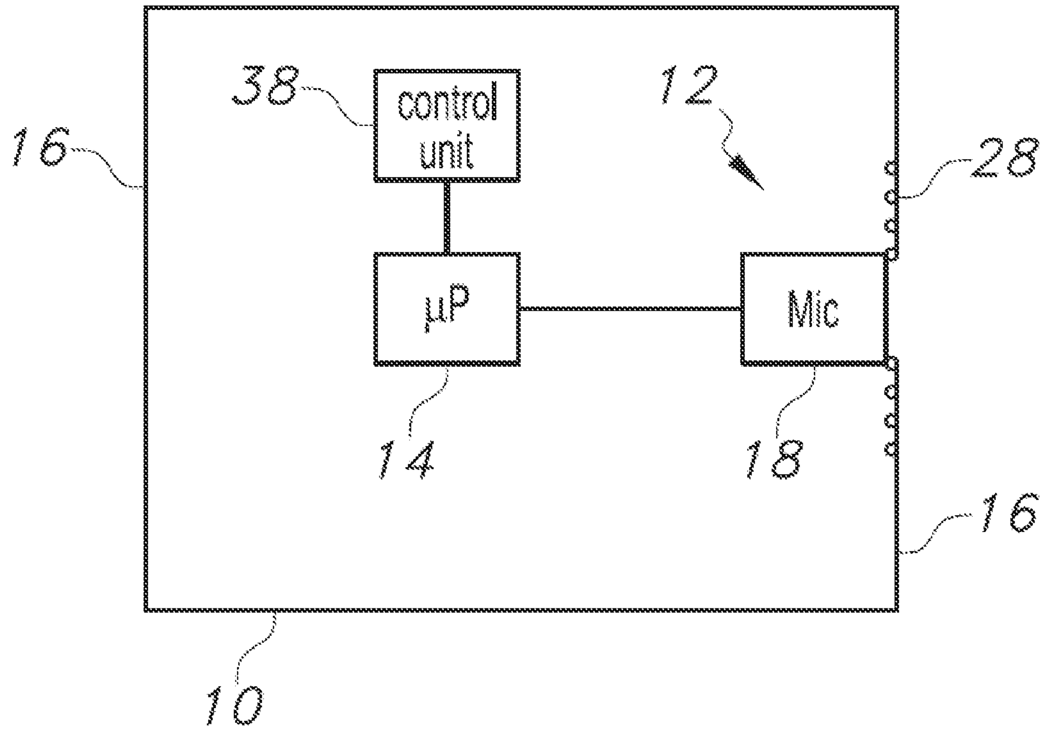
FIG. 1 is a schematic diagram of one embodiment of a surface vehicle including a heated microphone arrangement of the present invention.

FIG. 1 illustrates one embodiment of a surface vehicle 10 including a heated microphone arrangement 12 of the present invention. Surface vehicle 10 also includes an electronic processor 14 communicatively coupled to heated microphone arrangement 12 and to a higher-level control unit 38. Surface vehicle 10 further includes a body 16 within which electronic processor 14 and heated microphone arrangement 12 may be contained. Heated microphone arrangement 12 may include one or more heating elements 28 associated with a microphone 18.

Figure 2:
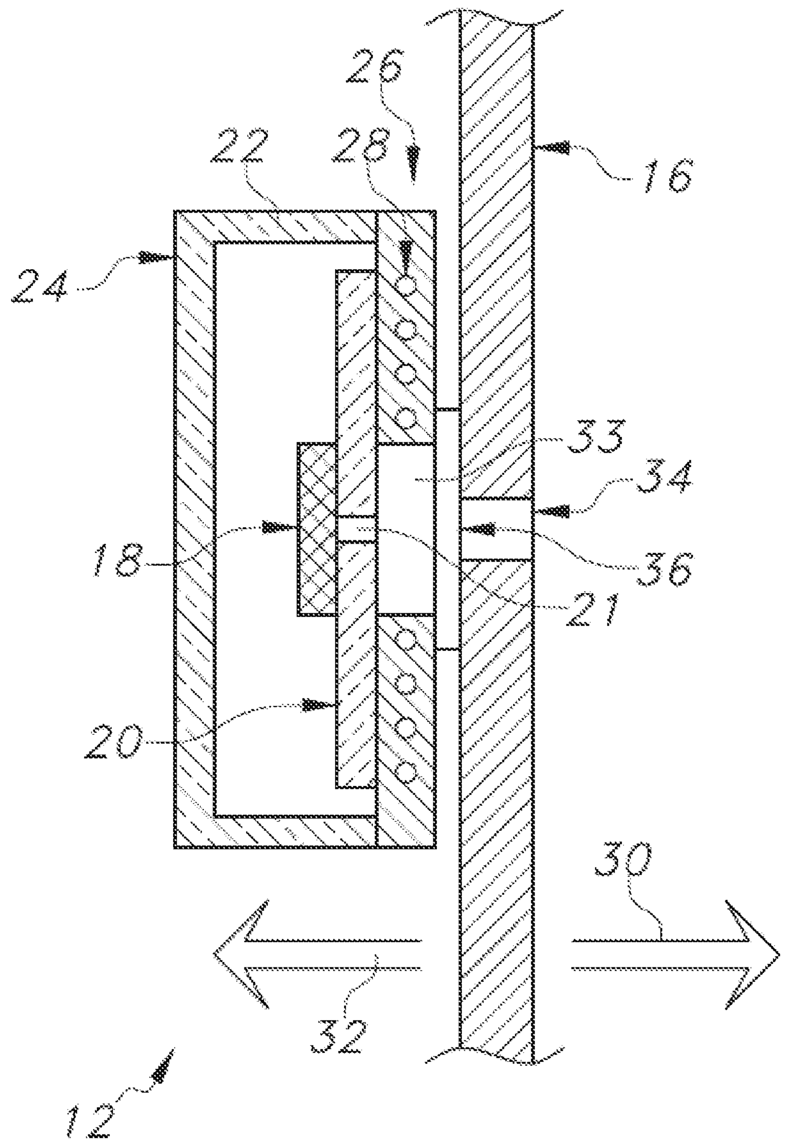
FIG. 2 is a cross-sectional schematic diagram of the heated microphone arrangement of the surface vehicle of FIG. 1.

FIG. 2 illustrates heated microphone arrangement 12 in more detail. Heated microphone arrangement 12 includes microphone 18 attached to a printed circuit board 20 having a through-hole 21. Both microphone 18 and printed circuit board 20 are enclosed within a housing or case 22 having an upper housing 24 and a lower housing 26. Although housing 26 is referred to herein as a "lower housing", and housing 24 is referred to herein as an "upper housing", lower housing 26 is shown in the embodiment of FIG. 2 as being disposed in a laterally outward direction relative to upper housing 24. Embedded in lower housing 26 may be one or more heating elements 28, which may be one or more heating wires. Heating wire(s) 28 may wind through lower housing 26 in a serpentine pattern, for example. Heating wire(s) 28 may receive electrical current from a battery or other voltage and current source (not shown) of vehicle 10 via printed circuit board 20. Heating wire(s) 28 may be electrically connected to or controlled by processor 14.

Body 16 separates and protects heated microphone arrangement 12 from an ambient environment 30 which may be cold, icy and/or wet. Body 16 may also retain the heat from heating elements 28 on an inner side 32 of body 16. Body 16 may include a through-hole in the form of a microphone port 34 through which microphone 18 may receive sound from the ambient environment. A microphone membrane 36 interfaces between and interconnects outer wall 26 and body 16 and protects microphone 18 from direct exposure to the outside environment.

During use, microphone 18 receives sound from outside vehicle 10 via microphone port 34, through membrane 36, through a through-hole 33 in lower housing 26, and through through-hole 21. In response to detecting the sound, microphone 18 transmits microphone signals to processor 14, wherein the signals are indicative of the sounds that microphone 18 detects through microphone port 34. In the event that processor 14 recognizes the sound of a siren in the microphone signals, processor 14 may send the sensor data to higher-level control unit 38, where the siren data is processed and decisions are made to yield to an emergency vehicle.

In one embodiment, heating element(s) 28 operate (e.g., draw current from a battery of vehicle 10) continuously while the ignition switch (not shown) is ON. In another embodiment, processor 14 turns ON heating element(s) 28 only when an ambient temperature sensor (not shown) indicates to processor 14 that the ambient temperature is at or below freezing (32 degrees Fahrenheit). In either embodiment, heating element(s) 28 may provide enough heat to body 16 to prevent any ice or snow from accumulating in, or blocking, microphone port 34 down to an ambient temperature of about −40 degrees Fahrenheit.

Figure 3:
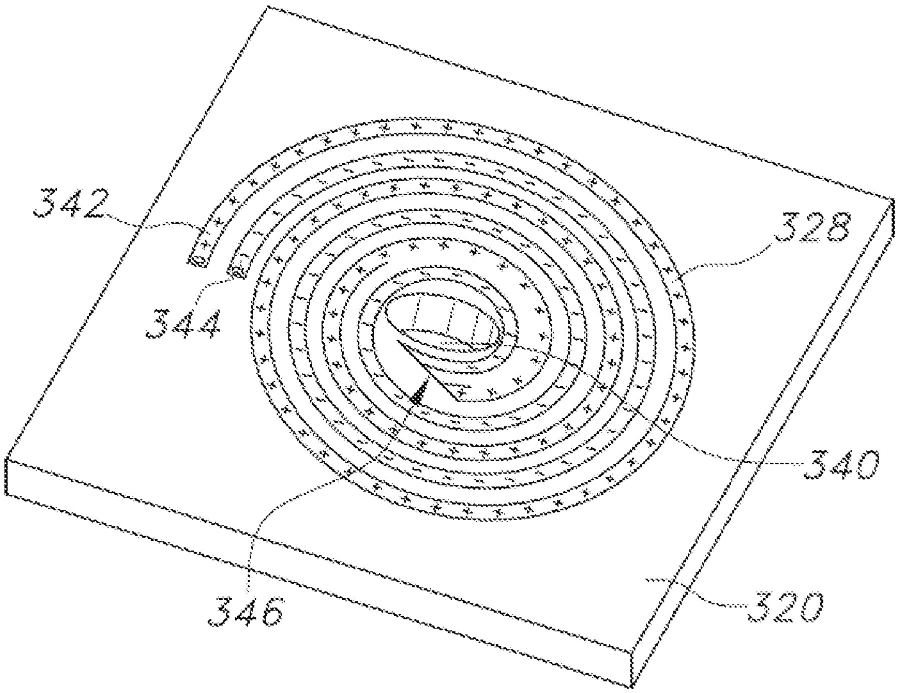
FIG. 3 is a perspective view of another embodiment of the circuit board of the arrangement of FIG. 2, wherein the heating element is embedded within the circuit board.

In another embodiment, the heating element is attached to the printed circuit board rather than being embedded in the housing. FIG. 3 illustrates an embodiment of such a printed circuit board 320 wherein a heating element 328 may be embedded within circuit board 320. Heating element 328 is applied to an underside of printed circuit board 320 (e.g., a side of printed circuit board 320 that is visible in FIG. 3 and that is opposite from the side to which the microphone is attached and is electrically connected). Circuit board 320 includes a hole or port 340 for receiving a microphone element (not shown). The microphone element may receive sounds from outside the vehicle through port 340. A positive voltage trace 342 is arranged in a helical pattern around port 340 and the microphone therein. A ground return trace 344 is also arranged in a helical pattern around port 340 and the microphone therein. A junction point 346 is where positive voltage trace 342 and ground return trace 344 are co-terminated (e.g., are electrically connected together).

Figure 4:
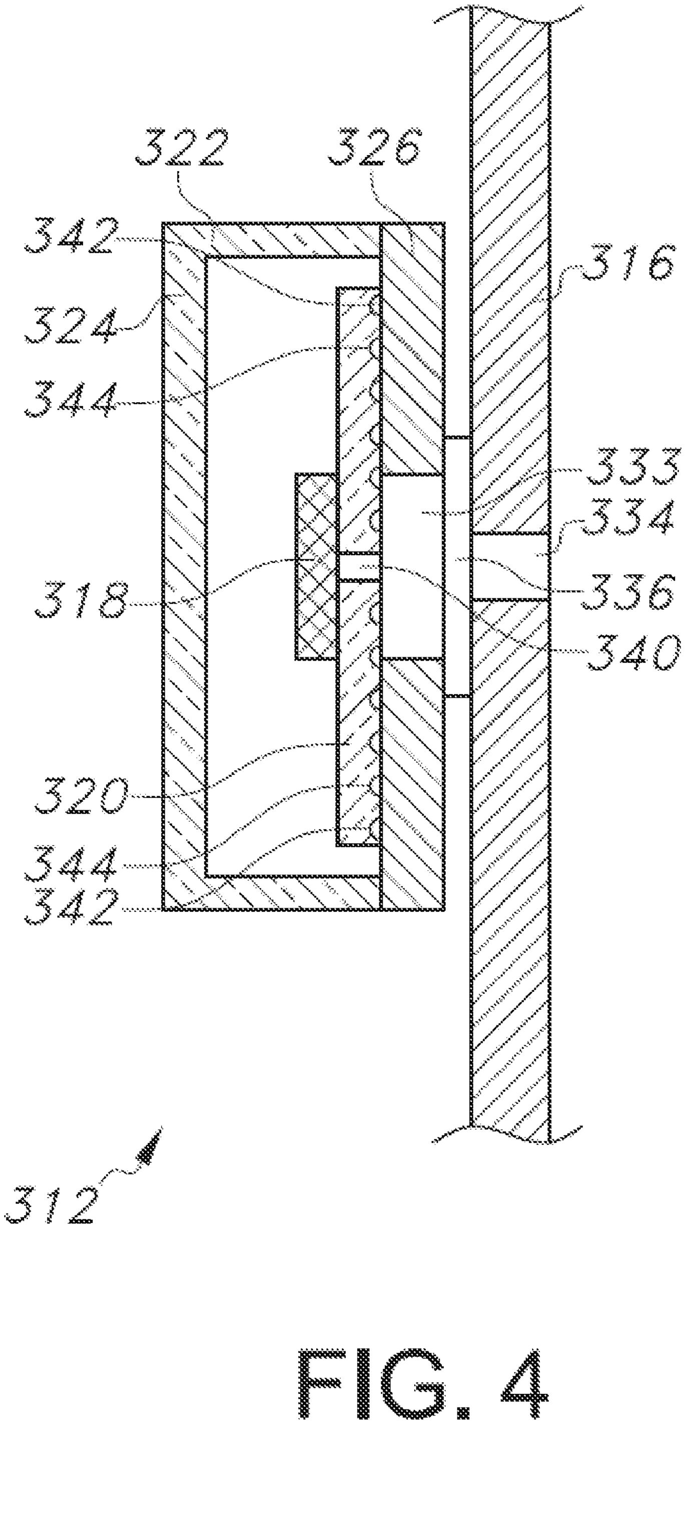
FIG. 4 is a cross-sectional schematic diagram of another embodiment of a heated microphone arrangement of the present invention incorporating the circuit board of FIG. 3.

Printed circuit board 320 may be incorporated in a heated microphone arrangement 312 (FIG. 4) including a microphone 318 attached to printed circuit board 320 and receiving acoustic input through port 340. Both microphone 318 and printed circuit board 320 are enclosed within a housing or case 322 having an upper housing 324 and a lower housing 326. Although housing 326 is referred to herein as a "lower housing", and housing 324 is referred to herein as an "upper housing", lower housing 326 is shown in the embodiment of FIG. 4 as being disposed in a laterally outward direction relative to upper housing 324. The sound transmission path to microphone 318 begins outside the vehicle body 316, enters through port 334, passes through membrane 336, through a through-hole 333 in lower housing 326, and through through-hole 340.

Figure 5:
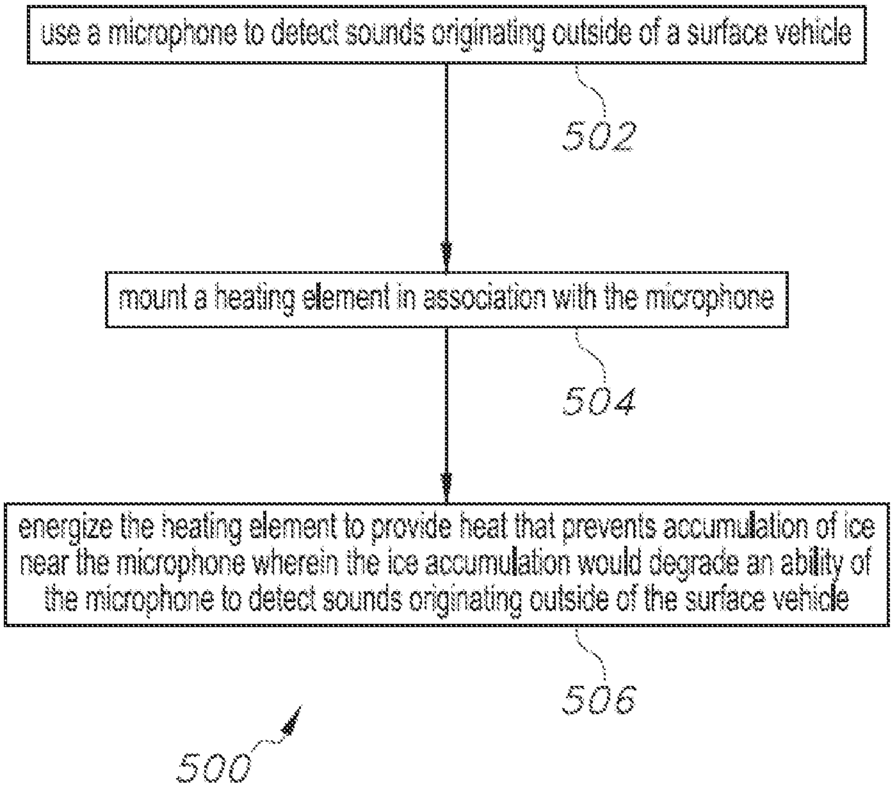
FIG. 5 is a flow chart of one embodiment of a method of the present invention for operating a microphone in a surface vehicle.

FIG. 5 illustrates one embodiment of a method 500 of the present invention for operating a microphone in a surface vehicle. In a first step 502, the microphone is used to detect sounds originating outside of the surface vehicle. For example, microphone 18 may receive sound from the ambient environment through microphone port 34.

Next, in step 504, a heating element is mounted in association with the microphone. For example, heating element 28 is embedded in lower housing 26 of a case 22 that contains microphone 18.

In a final step 506, the heating element is energized to provide heat that prevents accumulation of ice near the microphone wherein the ice accumulation would degrade an ability of the microphone to detect sounds originating outside of the surface vehicle. For example, heating element 28 may be electrically energized by a battery of the surface vehicle to provide heat that prevents accumulation of ice in through-holes 21, 33 and 34. Ice accumulation in through-holes 21, 33 and 34 would block sounds from the ambient environment from reaching microphone 18.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A surface vehicle, comprising:

a microphone configured to detect sounds originating outside of the surface vehicle;

a heating element mounted in association with the microphone and configured to provide heat for preventing accumulation of ice near the microphone wherein the ice accumulation would degrade an ability of the microphone to detect sounds originating outside of the surface vehicle; and a printed circuit board electrically connected to both the microphone and to the heating element, the printed circuit board being disposed between the microphone and the heating element.

2. The surface vehicle of claim 1 wherein the heating element comprises an electrical heating element.

3. The surface vehicle of claim 1 further comprising a vehicle body, the microphone and heating element being disposed within the body, the body including a through-hole, the microphone being configured to receive the sounds originating outside of the surface vehicle via the through-hole, the heating element being configured to provide heat for preventing accumulation of ice in the through-hole.

4. The surface vehicle of claim 3 further comprising a microphone membrane disposed between the microphone and the vehicle body.

5. The surface vehicle of claim 1 further comprising a housing enclosing the microphone, the heating element being embedded within a wall of the housing.

6. The surface vehicle of claim 1 wherein the printed circuit board includes a through-hole, the microphone being configured to receive the sounds originating outside of the surface vehicle via the through-hole.

7. A surface vehicle, comprising:

a vehicle body including a through-hole;

a microphone disposed within the vehicle body and configured to detect sounds originating outside of the surface vehicle, the microphone being configured to receive the sounds originating outside of the surface vehicle via the through-hole;

a heating element disposed within the vehicle body, the heating element being configured to provide heat for preventing accumulation of ice that would degrade an ability of the microphone to detect the sounds originating outside of the surface vehicle; and a printed circuit board electrically connected to both the microphone and to the heating element, the printed circuit board being disposed between the microphone and the heating element.

8. The surface vehicle of claim 7 wherein the heating element comprises an electrical heating element.

9. The surface vehicle of claim 7 wherein the heating element is configured to provide heat for preventing ice accumulation in the through-hole.

10. The surface vehicle of claim 7 further comprising a microphone membrane disposed between the microphone and the vehicle body.

11. The surface vehicle of claim 7 further comprising a housing enclosing the microphone, the heating element being embedded within a wall of the housing.

12. The surface vehicle of claim 7 wherein the printed circuit board includes a through-hole, the microphone being configured to receive the sounds originating outside of the surface vehicle via the through-hole.

13. A motor vehicle, comprising:

a vehicle body having an area of increased sound conductivity;

a microphone disposed within the vehicle body and configured to detect sounds originating outside of the motor vehicle, the microphone being configured to receive the sounds originating outside of the motor vehicle through the area of increased sound conductivity;

a heating element disposed within the vehicle body, the heating element being mounted in association with the microphone and configured to provide heat for preventing accumulation of ice in the area of increased sound conductivity and near the microphone wherein the ice accumulation would degrade an ability of the microphone to detect sounds originating outside of the motor vehicle; and a printed circuit board electrically connected to both the microphone and to the heating element, the printed circuit board being disposed between the microphone and the heating element.

14. The motor vehicle of claim 13 wherein the heating element comprises an electrical heating element.

15. The motor vehicle of claim 13 further comprising a microphone membrane disposed between the microphone and the vehicle body.

16. The motor vehicle of claim 13 further comprising a housing enclosing the microphone, the heating element being embedded within a wall of the housing.

17. The motor vehicle of claim 13 wherein the printed circuit board includes a through-hole, the microphone being configured to receive the sounds originating outside of the motor vehicle via the through-hole.

* * * * *